F. C. WALLACE & C. F. FORSYTH.

COMBINED BOTTLE CAP AND REMOVER.

APPLICATION FILED JAN. 29, 1915.

Reissued Apr. 27, 1915.

13,908.

Reissue

Inventors

Francis C. Wallace

Charles F. Forsyth

By Franklin H. Hoyt

Attorney

Witnesses

Philip E. Barnes

J. H. Sherwood

UNITED STATES PATENT OFFICE.

FRANCIS C. WALLACE, OF DRUMMOND, MARYLAND, AND CHARLES F. FORSYTH, OF WASHINGTON, DISTRICT OF COLUMBIA, ASSIGNORS, BY MESNE ASSIGNMENTS, TO LITTLE GIANT MANUFACTURING COMPANY, A CORPORATION OF DELAWARE.

COMBINED BOTTLE-CAP AND REMOVER.

13,908. Specification of Reissued Letters Patent. Reissued Apr. 27, 1915.

Original No. 986,524, dated March 14, 1911, Serial No. 565,073. Application for reissue filed January 29, 1915. Serial No. 5,148.

*To all whom it may concern:*

Be it known that we, FRANCIS C. WALLACE and CHARLES F. FORSYTH, citizens of the United States, residing, respectively, at Drummond, in the county of Montgomery and State of Maryland, and Washington, District of Columbia, have invented certain new and useful Improvements in Combined Bottle-Caps and Removers; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in devices for removing caps from bottles, the object in view being to produce a simple and efficient puller device which will be held to the cap by friction intermediate the cap or closure and cork or filler, by crimping, or otherwise compressing the cap and applying it to the neck of a bottle.

The invention comprises various details of construction and arrangements of parts which will be hereinafter fully described and then specifically defined in the appended claims.

We illustrate our invention in the accompanying drawings, in which:—

Figure 1:
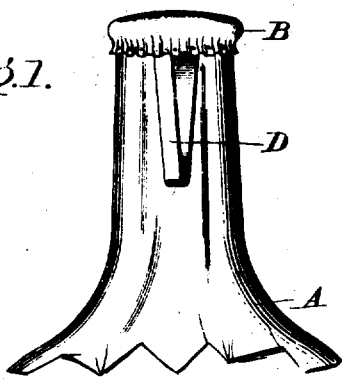
Figure 3:
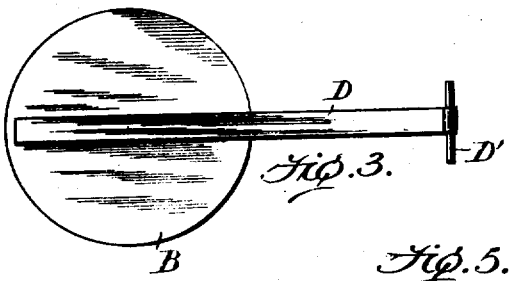
Figure 4:
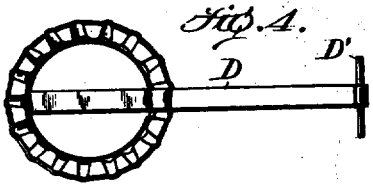
Figure 5:
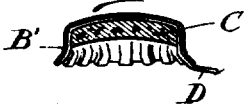
Figure 6:
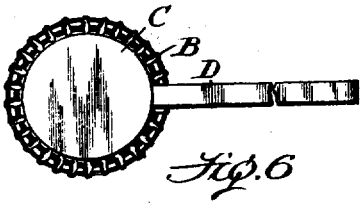
Figure 2:
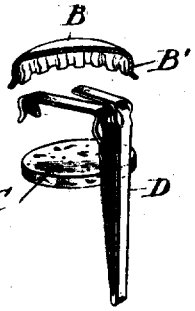

Figure 1 is a side elevation of a bottle showing a cap and removing device applied thereto. Fig. 2 is a sectional and perspective view of the stopper and removing device separated from the neck of the bottle. Fig. 3 is a slightly modified form of the device showing a removing puller strap held against the under surface of the closure before the edge thereof is crimped. Fig. 4 is a view of the parts shown in Fig. 3 without the filler with the edge of the closure crimped. Fig. 5 is a sectional view through the form shown in Fig. 4, and the filler inserted in place, and Fig. 6 is a face view similar to Fig. 4 with the cork adjusted in place.

Reference now being had to the details of the drawings by letter, A designates a bottle having a crimped closure or cap B fitted over the end of the neck thereof. Said closure contains a sealing means or filler, shown as a cork C, which is held within the closure by the crimped edge B′ of the cap in the usual manner.

D designates a puller or detaching means, which may be of any suitable material, such as a strap of tape or fibrous material, provided it is flexible and compressible, the ends of said strap being positioned intermediate the cap and closure prior to the insertion of the cork, after which the edge of the cap is crimped and the ends of the strap securely anchored to the cap or closure. In order to avoid two thicknesses of the strap coming one over the other, the arms of the strap are preferably positioned side by side at the positions where they enter the cap, as shown clearly in Fig. 1 of the drawings. The strap being formed as shown, a loop is provided whereby the finger of a person or any article may be inserted therein for convenience in removing the cap by pulling upon the loop, as will be readily understood. By providing the cap with a puller of flexible material, the outer loop will fall close to the neck of the bottle in no way interfering with handling or packing while permitting of a hand grasp that will not cut the fingers in pulling. By using a compressible material, such as a textile strap, we avoid the pressure of any hard body between the cap and the bottle which would prevent a substantially even pressure on the packing or filler, thus causing leakage, while also tending to fracture the bottle in sealing.

In Fig. 3, we have shown modifications of the invention in which a single strap D is provided, which is made of any suitable flexible material and having a cross-piece D′ at one end, forming a handle whereby the cap may be conveniently removed by pulling upon the cross-piece after the strap has been securely anchored to the closure by the crimping of the marginal edge thereof.

What we claim to be new is:—

1. The combination with a crown cap and its filler, of a strap of flexible, compressible material, the ends of the strap positioned intermediate the cap and filler, said strap extending beyond the cap to form a puller and being crimped between the cap and the bottle neck, for the purpose described.

2. The combination with a metallic flanged cap, having a compressible filler, of a puller consisting of a strap of flexible compressible material secured between the cap and bottle neck and extending beyond the cap for the purpose described.

3. In combination with a crown cap, a filler therefor, a flexible compressible strap independent of the cap and bent to form a loop and extending between the filler and cap, the strap being crimped with the marginal edge of the cap against the bottle neck, one end of the strap extending across the filler and engaging over the edge thereof.

In testimony whereof we hereunto affix our signatures in the presence of two witnesses.

FRANCIS C. WALLACE.
CHAS. F. FORSYTH.

Witnesses:
FRANKLIN H. HOUGH,
A. R. FOWLER.